United States Patent [19]

Zhang et al.

[11] Patent Number: 5,589,289

[45] Date of Patent: Dec. 31, 1996

[54] CARBON ELECTRODE MATERIALS FOR ELECTROCHEMICAL CELLS AND METHOD OF MAKING SAME

[75] Inventors: Jinshan Zhang, Duluth; Anaba A. Anani, Norcross, both of Ga.

[73] Assignee: Motorola, Inc., Schaumburg, Ill.

[21] Appl. No.: 534,427

[22] Filed: Sep. 27, 1995

[51] Int. Cl.$^6$ ............................................. H01M 6/00
[52] U.S. Cl. ............................ 429/122; 429/218; 204/294; 423/445 R; 423/448
[58] Field of Search ................................ 429/212, 218, 429/40, 27, 213, 122; 204/294; 423/445 R, 448

[56] References Cited

U.S. PATENT DOCUMENTS

| | | |
|---|---|---|
| 3,802,268 | 4/1974 | Thoma ................................. 73/336.5 |
| 4,908,198 | 3/1990 | Weinberg ................................ 429/218 |
| 5,219,680 | 6/1993 | Fauteux .................................. 429/218 |
| 5,324,599 | 6/1994 | Oyama et al. ......................... 429/213 |
| 5,340,670 | 8/1994 | Takami et al. ......................... 429/218 |
| 5,358,805 | 10/1994 | Fujimoto et al. ...................... 429/218 |
| 5,378,561 | 1/1995 | Kurukawa et al. .................... 429/218 |

*Primary Examiner*—Bruce F. Bell
*Attorney, Agent, or Firm*—Kenneth M. Massaroni

[57] ABSTRACT

A method for preparing an amorphous carbon material for use as an electrode, such as the anode of an electrochemical cell. The amorphous carbon is fabricated in a one heating step process from multi-functional organic monomers. Electrodes so fabricated may be incorporated into electrochemical cells (10) as the anode (20) thereof.

4 Claims, 8 Drawing Sheets

CARBON ELECTRODE MATERIALS FOR ELECTROCHEMICAL CELLS AND METHOD OF MAKING SAME

TECHNICAL FIELD

This invention relates in general to the field of electrodes and materials for electrochemical cells, and in particular to methods of synthesizing said electrodes and materials.

BACKGROUND OF THE INVENTION

As electronic devices and other electrical apparatuses increasingly become portable, advances must be made in energy storage systems to enable such portability. Indeed, it is often the case with current electronics technology that the limiting factor to portability of a given device is the size and weight of the associated energy storage device. Obviously, a small energy storage device may be fabricated for a given electrical device, but at the cost of energy capacity. Conversely, a long-lasting energy source can be built, but it is then too large to be comfortably portable. The result is that the energy source is either too bulky, too heavy, or it doesn't last long enough. The main energy storage device used for portable electronics is the electrochemical battery cell, and less frequently, the electrochemical capacitor.

Numerous different battery systems have been proposed for use over the years. Early rechargeable battery systems included lead-acid, and nickel-cadmium (Nicad), each of which have enjoyed considerable success in the marketplace. Lead-acid batteries, because of their ruggedness and durability, have been the battery of choice in automotive and heavy industrial applications. Conversely, Nicads have been preferred for smaller or portable applications. More recently, nickel metal hydride systems (NiMH) have found increasing acceptance for both large and small applications.

Notwithstanding the success of the aforementioned battery systems, other new batteries are appearing on the horizon which offer the promise of better capacity, better power density, and longer cycle life as compared with the current state of the art. The first such system to reach the market is the lithium ion battery, which is already finding its way into consumer products. Lithium polymer batteries are also receiving considerably attention, though have not yet reach the market.

Lithium batteries in general include a positive electrode fabricated of a transition metal oxide material, and a negative electrode fabricated of an activated carbon material such as graphite or petroleum coke. New materials for both electrodes have been investigated intensely because of their high potential gravimetric energy density. To date, however, most of the attention has been focused on the transition metal oxide electrode.

The importance of carbon based materials in electrochemical systems in general cannot be understated. In energy storage and power generating applications carbon based materials are being vigorously pursued as an active material component. Fuel cell electrodes, and catalysts also make use of carbon based materials as active ingredients for various chemical reactions.

These carbon based or carbonaceous materials are routinely prepared by using difunctional monomers as polymer precursors. Examples of such precursors include resins of furfuryl alcohol, phenol, formaldehyde, acetone-furfural, or furfural alcohol-phenol copolymer. Other precursors include polyacrylonitrile and rayon polymers, as disclosed in Jenkins, et al, *Polymeric Carbons-Carbon Fibre, Glass and Char*, Cambridge University Press, Cambridge, England (1976). These precursors are then subjected to a process of curing and carbonizing, usually very slowly, and at temperatures of up to 2,000° C. Two major steps are involved in these processes: (1) synthesis of polymer precursors from difunctional monomers via wet chemistry; and (2) pyrolysis of the precursors. The method typically results in a relatively low overall yield due to the two step process. For example, conventional processing of polyacrylonitrile typically yields only about 10% of a usable carbonaceous material. Further, many impurities may be incorporated into the carbonaceous material, deleteriously effecting the electrochemical properties.

Accordingly, there exists a need for an improved, amorphous carbon material for use in electrochemical and other applications. The material should be easily manufactured in a simple, high yield method.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 1:
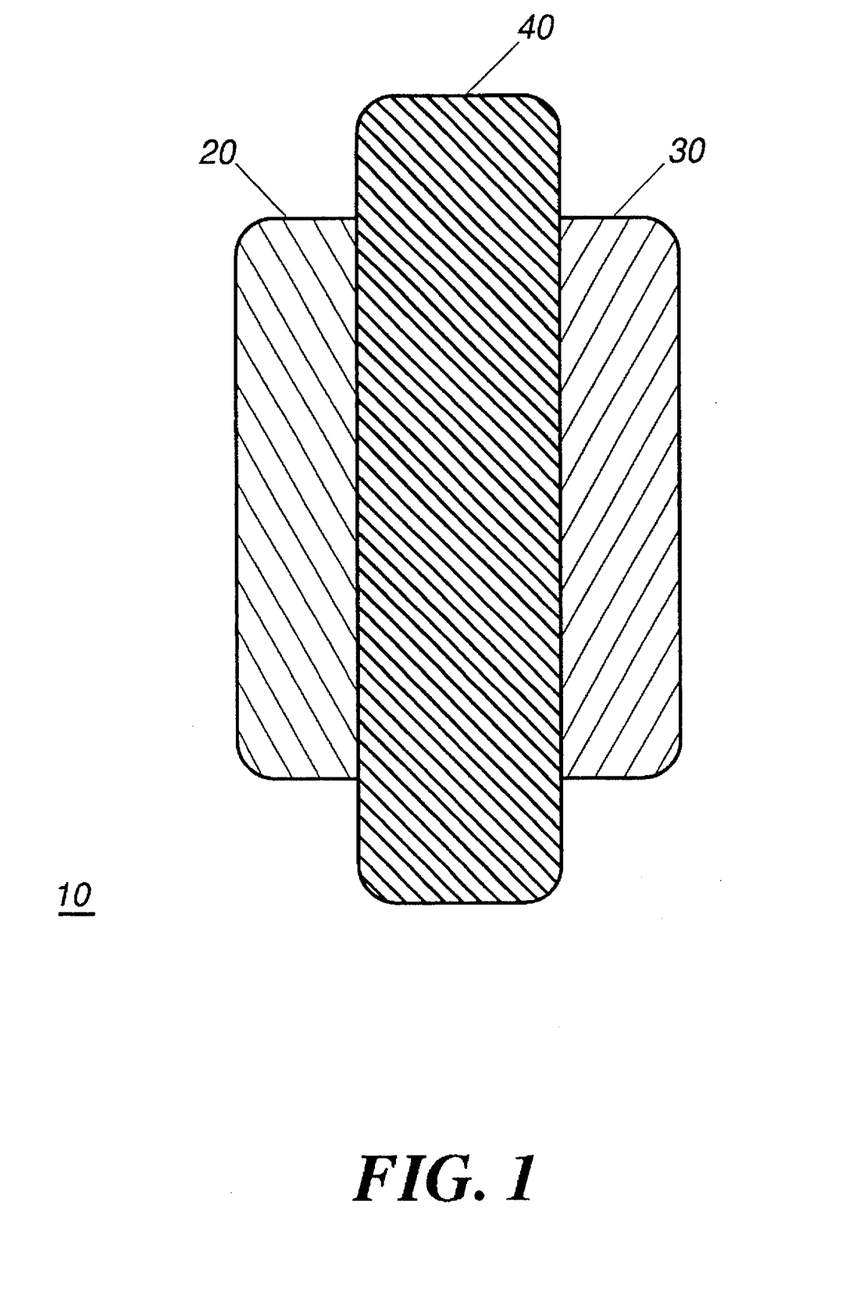
FIG. 1 is a schematic representation of an electrochemical cell including an electrode fabricated of an amorphous carbon material, in accordance with the instant invention.

Referring now to FIG. 1, there is illustrated therein a schematic representation of an electrochemical cell 10 such as a battery or an electrochemical capacitor, and including a carbon-based or amorphous carbon electrode material fabricated in accordance with the instant invention. The electrochemical cell includes a positive electrode or cathode 20, a negative electrode or anode 30 and an electrolyte 40 disposed therebetween. The cell negative electrode 30 is fabricated of an amorphous carbon or carbon-based material such as that described in greater detail hereinbelow. The positive electrode 20 of the cell 10 may be fabricated from a lithiated transition metal oxide such as are well known in the art. Alternatively, the positive electrode material may be fabricated of a material such as that described in commonly assigned, co-pending patent application Ser. No. 08/464,440 filed Jun. 5, 1995, in the name of Mao, et al, and entitled "Positive Electrode Materials for Rechargeable Electrochemical Cells and Method of Making Same", the disclosure of which is incorporated herein by reference.

The electrolyte 40 disposed between the electrodes may be any of the electrolytes known in the art including, for example, $LiClO_4$ in propylene carbonate, or polyethylene oxide impregnated with a lithiated salt. The electrolyte 40 may also act as a separator between the positive and negative electrodes. The electrolyte may also be aqueous, non-aqueous, solid state, gel, or some combination thereof.

Figure 2:
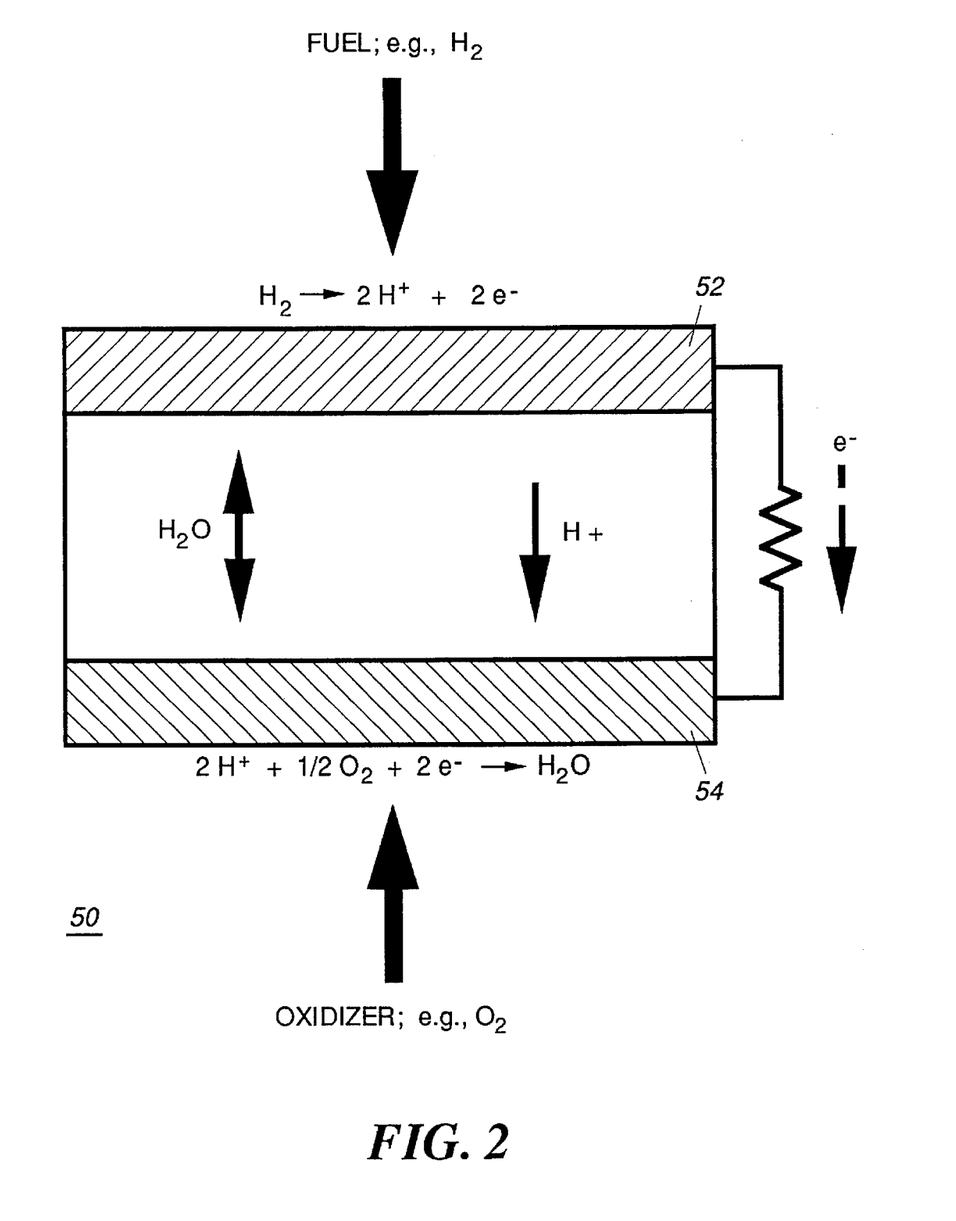
FIG. 2 is a schematic representation of a fuel cell including an electrode fabricated of an amorphous carbon material, in accordance with the instant invention.

Referring now to FIG. 2, there is illustrated therein a schematic representation of a fuel cell including an amorphous carbon electrode in accordance with the instant invention. The fuel cell 50 includes first and second electrodes 52, 54, at least one of which is fabricated of the instant material. Fuel cell operation is similar to that of a battery, except that one or both of the reactants are not permanently contained as in the electrochemical cell. Rather the reactants are fed into the fuel cell via an external source when power is desired. The fuels are usually gaseous or liquid (compared with the metal anodes generally used in batteries), and oxygen or air is the oxidant. The electrode material of fuel cells are inert in that they are not consumed during the cell reaction, but they have catalytic properties which enhance the electrode oxidation of the fuel cell's active materials. A typical fuel cell reaction is illustrated by the hydrogen/oxygen fuel cell, which reactions are illustrated in FIG. 2. In such a device, hydrogen is oxidized at the anode, electrocatalyzed by platinum or platinum alloys while at the cathode, oxygen is reduced again with platinum or platinum alloys as electrocatalyst. The platinum or platinum alloys are typically captured in a carbon matrix. Thus the fuel cell electrodes 52, 54, may be fabricated of an amorphous carbon in accordance with the invention. Typical uses of fuel cells are in applications requiring electric energy for long periods of time, such as in space flights, as an alternate for moderate power engine generators, and for utility load leveling.

In accordance with the instant invention, there is provided a method for synthesizing an amorphous carbon or carbon-based material for use as an electrode in an electrochemical device such as a battery or a capacitor, a fuel cell, or a catalyst. The carbon-based materials are substantially amorphous, though may be partially or completely crystalline or include crystalline inclusions if desired, and may include an amount of one or more modifiers. The exact nature of the modifiers is dependent upon the specific application contemplated.

Instead of the difunctional monomer precursors used in the prior art, the instant invention uses multi-functional organic monomers, each having at least three functional groups of two kinds. More specifically, the multi-functional organic monomers have the general formula of:

wherein $R_1$, $R_2$, and $R_3$ are each a functional group, and are all selected from the group consisting of carboxylic acids of eight carbons or less, carboxylic esters of eight carbons or less, alcohols of eight carbons or less, carboxylic anhydrides of eight carbons or less, amines, and combinations thereof, and wherein at least one of $R_1$, $R_2$, and $R_3$ is different than the others. In one preferred embodiment, at least one functional group is a carboxylic ester. It is also to be noted that in the fabrication process of the materials described below, differing functional groups may in fact react with one another.

In one preferred embodiment, the multi-functional organic monomer is selected from the group consisting of 5-hydroxyisophthalic acid, 5-aminoisophthalic acid, α-resorcyclic acid, β-resorcyclic acid, δ-resorcyclic acid, gentisic acid, protocatechuic acid, and combinations thereof. In another particularly preferred embodiment, the multi-functional organic monomer is α-resorcyclic acid. While preferred multi-functional organic monomers are recited above, it is to be noted that the instant invention is not so limited. Indeed, many other organic monomers may be employed equally advantageously.

With respect to the fabrication of carbon materials, it has been found that when the organic monomer is heated in the presence of an acid, the reaction of the monomer is more complete, and results in an improved yield of the final product. Hence, the amorphous carbon material may be formed with an acid present. Examples of acids preferred include acids selected from the group consisting of acetic acid, boric acid, phosphoric acid, p-toluenesulfonic acid, 4-amino benzoic acid, trifluoroacetic acid, and combinations thereof. It is hypothesized that the acids are acting as catalysts in the ester condensation reaction of the organic monomer. The acid may be present in amounts between 1 and 25% weight percent. While preparation of the material is preferably carried out in the presence of an acid as described, such materials may be fabricated without the acid, with the result being lower overall yields of the final product.

In the preparation of the amorphous material, it is contemplated that the monomer is heated, along with the acid catalyst, in an inert environment. Preferred inert environments include, for example, nitrogen, argon, and/or helium. The materials are heated at temperatures sufficient to induce a solid state carbonization of the multi-functional monomers. This process is similar in nature to a sublimation process, and occurs at temperatures of less than about 1200° C., and preferably about 600° C.

The method of the instant invention incorporates the step of polymerization and carbonization of the materials into a single process, in solid state. The multi-functional monomers described hereinabove polymerize at lower temperatures. Once polymerized, the multi-functional monomers form a hyperbranched polymer which subsequently carbonizes at slightly higher temperatures to form the amorphous carbon material. As the multi-functional organic monomers generally contain the elements of carbon, hydrogen, oxygen, and nitrogen in varying combinations, the carbonization process refers to the fact that the organic precursor decomposes, evolving compounds including carbon-oxygen, carbon-hydrogen, hydrogen-oxygen, nitrogen-hydrogen, and other similar compounds. The remaining carbon atoms condense into planar structures terminating predominantly with edge hydrogen atoms, the amount of hydrogen atoms depending upon the temperature of the initial part of the carbonization process.

The one-step polymerization/carbonization of the multi-functional monomer can be understood from the following diagram which illustrates the reaction mechanism for the polymerization/carbonization. The reaction involves an initial state, an intermediate state, and the final product. In the initial state, the multi-functional monomer, for example, α-resorcyclic acid, is heated at relatively low temperatures, which results in the condensation of the monomer and driving off of water vapor. This phase of the reaction is illustrated by the following formula:

compared to the prior art. Further, and as described hereinabove, when the reaction is carried out in the presence of an acid, the acid catalyzes the ester reduction reaction and hence causes an improved yield of the final product. The second stage of the process may be best understood from the reaction illustrated in the following formula:

Upon further heating, the resulting hyperbranched polymer decomposes and forms carbon-carbon bonds between the phenyl rings of the starting monomers. As the temperature increases up to, for example, 500°–700° C., the six carbon phenyl rings start to break and form a layered carbon network. The formation of hyperbranched carbon polymers in the first stage of the process results in moving the monomer molecules physically closer to one another, thus facilitating carbonization in the second step of the process. This also accounts, at least partially, for improved yields as Referring now to FIG. 3, there is illustrated therein a flow chart 100 describing the steps for preparing the amorphous carbon material described above. The first step illustrated in FIG. 2 is shown in box 102, and comprises the step of selecting an appropriate multi-functional organic monomer as described above. Thereafter, as illustrated in box 104, is the step of selecting the treatment temperature ranges for the solid state carbonization process for the selected monomer. More particularly, the yield of the amorphous carbon material from a particular multi-functional monomer will depend in large part on the thermal regime to which the monomer is subjected. Thermogravimetric analysis (TGA) and differential scanning calorimetry (DSC) each provide an excellent means by which to predetermine the processing temperature regime. The results have generally indicated that the solid state carbonization process should be a two temperature, one-step heating process, as described below.

Figure 4:
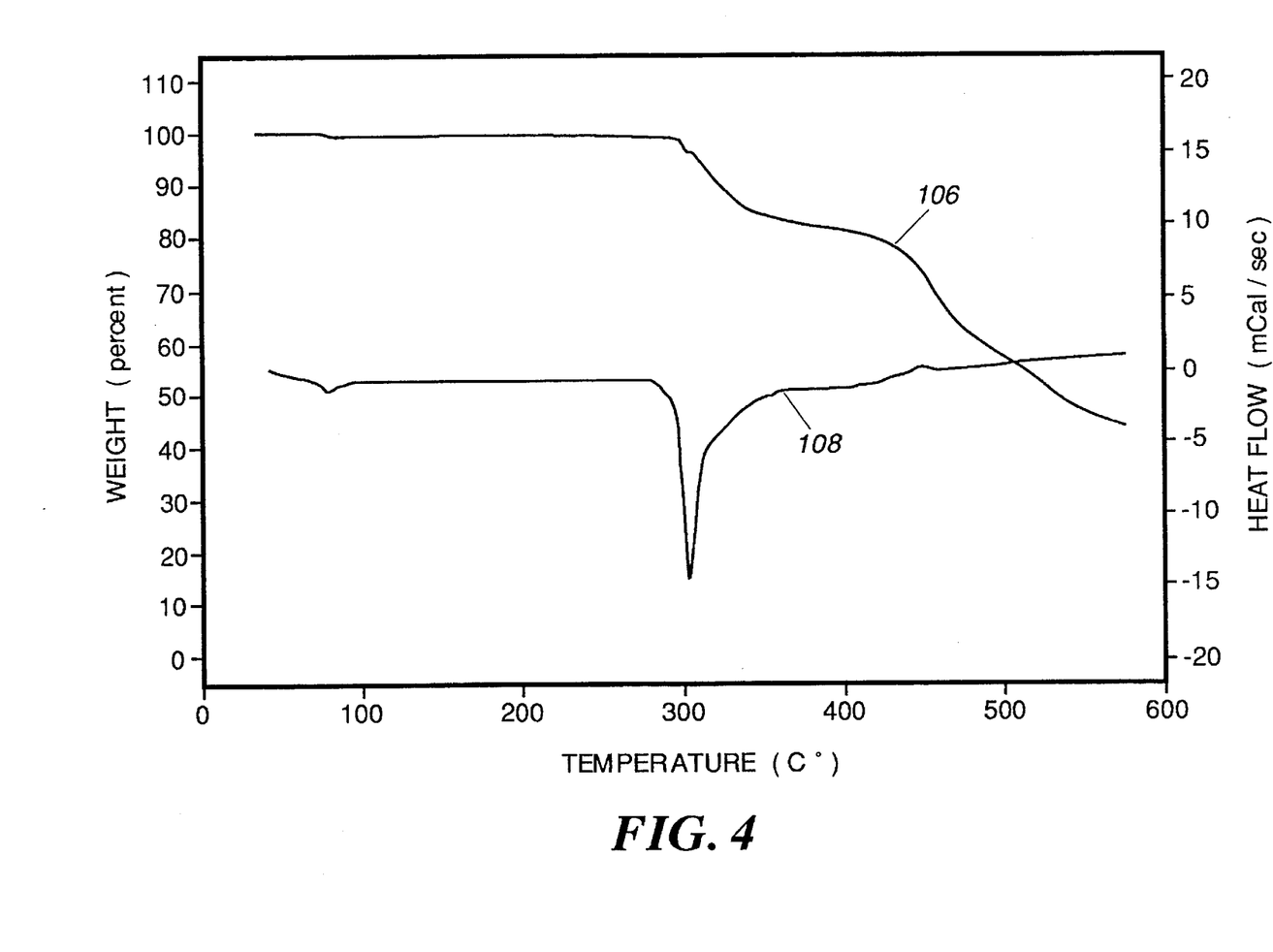
FIG. 4 is a graph illustrating the thermogravimetric analysis (TGA) and differential scanning calorimetry (DSC) for 5-hydroxyisophthalic acid.

Thus, and referring now to FIG. 4, a DSC 106 and TGA 108 analysis for 5-hydroxyisophthalic acid shows a large endothermic reaction at about 303° C., which also marks the start of a weight loss which amounts to approximately 20% of the total mass of the monomer, after the peak. The peak is the result of the condensation reaction of the carboxylic acid group and the alcohol groups. Hence, to correspond to the reaction described above, the first temperature plateau should be to this point, i.e., 300 for 5-hydroxyisophthalic acid.

Figure 5:
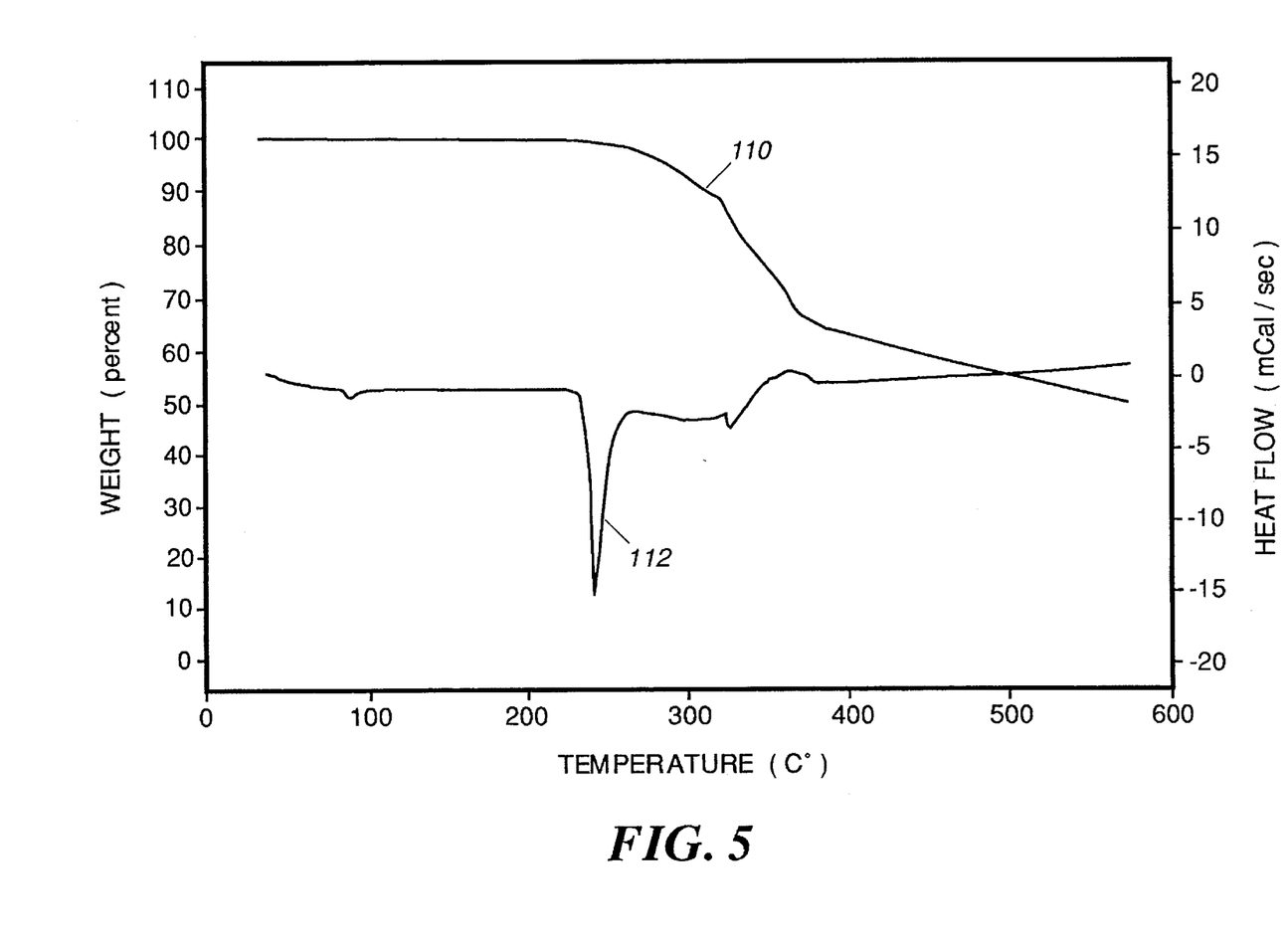
FIG. 5 is a graph illustrating the thermogravimetric analysis (TGA) and differential scanning calorimetry (DSC) for α-resorcyclic acid.

Similarly, and referring to FIG. 5, a DSC 110 and TGA 112 analysis for α-resorcyclic acid shows an endothermic transition or peak, but one which occurs at a much lower temperature, i.e., 240° C. After the transition, the monomer experiences substantial weight loss up to approximately 367° C. (approximately 36%). From this, it can be concluded that the first temperature plateau should be at about 240° C. to condense the functional groups. Similar testing is conducted on other potential monomers to determine the optimal heating regimen for that particular material.

Returning now to FIG. 3, the next step in the fabrication process of flow chart 100 is illustrated in box 114, and comprises the step of mixing the multi-functional organic monomer with an acid selected from the group of acids described above. The two materials should be mixed thoroughly, and further may be dried, as in a drying oven, prior to subjecting the mixture to the solid state carbonization process. It is to be noted that the acid catalyst provides improved yield of the final product, but is not necessary to carry out the reaction. Further, as noted above, the acid is believed to catalyze the ester condensation reaction. Hence, if the starting multi-functional monomers contain no esters, the acid may not be required.

Figure 3:
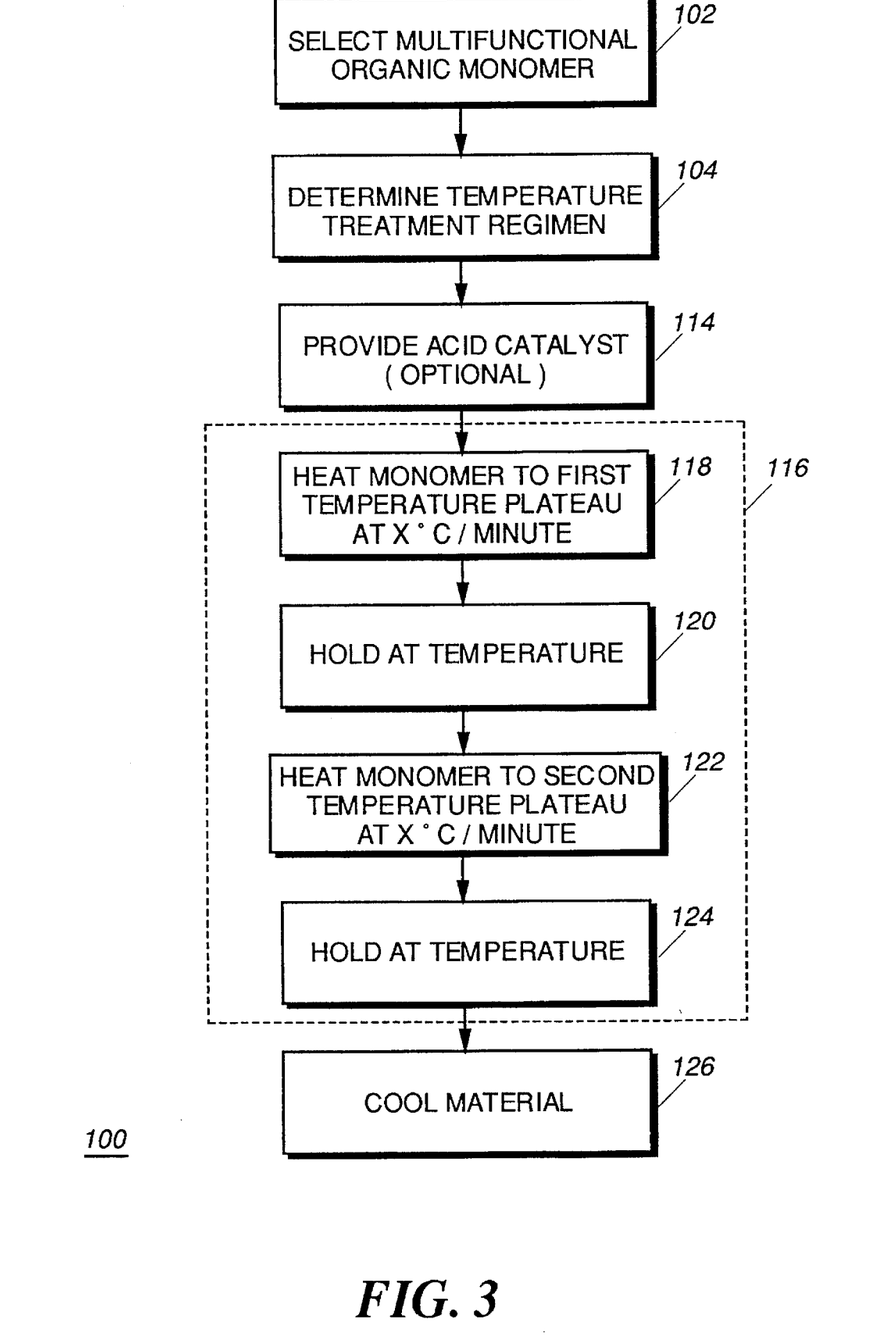
FIG. 3 is a flowchart illustrating the steps for preparing an amorphous carbon material in accordance with the instant invention.

The next step illustrated in FIG. 2 is the solid state carbonization process 116, which may comprise a multi-step heating regime. As illustrated in FIG. 3, step 116 actually comprises four steps illustrated by boxes 118, 120, 122, and 124. Each step in the carbonization process will depend upon the DSC and TGA testing described above. Generally however, the step illustrated by box 118 comprises the step of heating the dried monomer/acid mixture to a first temperature at a predetermined rate of X° C./minute. Once the desired temperature is reached, the mixture is held at that temperature for a predetermined time period, as illustrated in box 120.

Thereafter, the material is heated to a second, typically higher temperature, at a rate of X° C./minute, as illustrated in box 122. Once the second desired temperature is reached, the mixture is held at that temperature for a predetermined time period, as illustrated in box 116. After solid state carbonization is completed, the resulting amorphous carbon material is cooled slowly as illustrated in box 126. Cooling should be at an appropriate rate to assure that the material retains its substantially amorphous character.

The instant invention may be better understood from the examples provided below.

EXAMPLES

Example I 10.0 grams (g) of α-resorcyclic acid was subjected to a solid state carbonization process, in an inert environment, according to the following program: 1) heating the monomer from room temperature to 220° C. at a rate of 1° C./minute; 2) holding the material at that temperature for 8 hours; 3) heating the material from 220° C. to 500° C. at a rate of 1° C./minute; and 4) holding the material at that temperature for 24 hours. The resulting amorphous carbon material weighed 5.20 g, indicating a yield of 52%. X-ray diffraction analysis indicates that the material was amorphous.

Example II 5.0 grams (g) of α-resorcyclic acid was subjected to a solid state carbonization process, in an inert environment, according to the following program: 1) heating the monomer from room temperature to 220° C. at a rate of 1° C./minute; 2) holding the material at that temperature for 8 hours; 3) heating the material from 220° C. to 900° C. at a rate of 1° C./minute; and 4) holding the material at that temperature for 24 hours. The resulting amorphous carbon material weighed 1.88 g, indicating a yield of 37.6%. X-ray diffraction analysis indicated that the material was amorphous.

Example III 5.0 grams (g) of α-resorcyclic acid, 0.5 g of phosphoric acid and 5.0 g of deionized water were thoroughly mixed in a glass flask. The mixture was then dried in an inert environment, yielding a mixture weighing 5.5 g. This mixture was subjected to a solid state carbonization process, in an inert environment, according to the following program: 1) heating the monomer from room temperature to 220° C. at a rate of 1° C./minute; 2) holding the material at that temperature for 8 hours; 3) heating the material from 220° C. to 500° C. at a rate of 1° C./minute; and 4) holding the material at that temperature for 24 hours. The resulting material weighed 2.81 g, indicating a yield of 56.2% of the original monomer. The resulting product was an amorphous carbon material.

Example IV 5.0 grams (g) of a-resorcyclic acid, 0.5 g of p-toluenesulfonic acid and 5.0 g of deionized water were thoroughly mixed in a glass flask. The mixture was then dried in an inert environment, yielding a mixture weighing 5.5 g. This mixture was subjected to a solid state carbonization process, in an inert environment, according to the following program: 1) heating the monomer from room temperature to 220° C. at a rate of 1° C./minute; 2) holding the material at that temperature for 8 hours; 3) heating the material from 220° C. to 500° C. at a rate of 1° C./minute; and 4) holding the material at that temperature for 24 hours. The resulting material weighed 3.02 g, indicating a yield of 60.4% of the original monomer. The resulting product was an amorphous carbon material.

Example V 5.0 grams (g) of 5-hydroxyisophthalic acid was subjected to a solid state carbonization process, in an inert environment, according to the following program: 1) heating the monomer from room temperature to 310° C. at a rate of 1° C./minute; 2) holding the material at that temperature for 8 hours; 3) heating the material from 310° C. to 500° C. at a rate of 1° C./minute; and 4) holding the material at that temperature for 24 hours. The resulting material weighed 1.70 g, indicating a yield of 34.0%, and was an amorphous carbon material.

Example VI 5.0 grams (g) α-resorcyclic acid was subjected to a solid state carbonization process, in an inert environment, according to the following program: (1) heating the monomer from room temperature to 220° C. at a rate of 1° C./minute; (2) holding the material at that temperature for 8 hours; (3) heating the material from 220° C. to 600° C. at a rate of 1° C./minute; and (4) holding the material at that temperature for 24 hours. The resulting material weighted 2.24 g, indicating a yield of 44.8%. X-ray diffraction indicates that the carbon material is amorphous.

Figure 6:
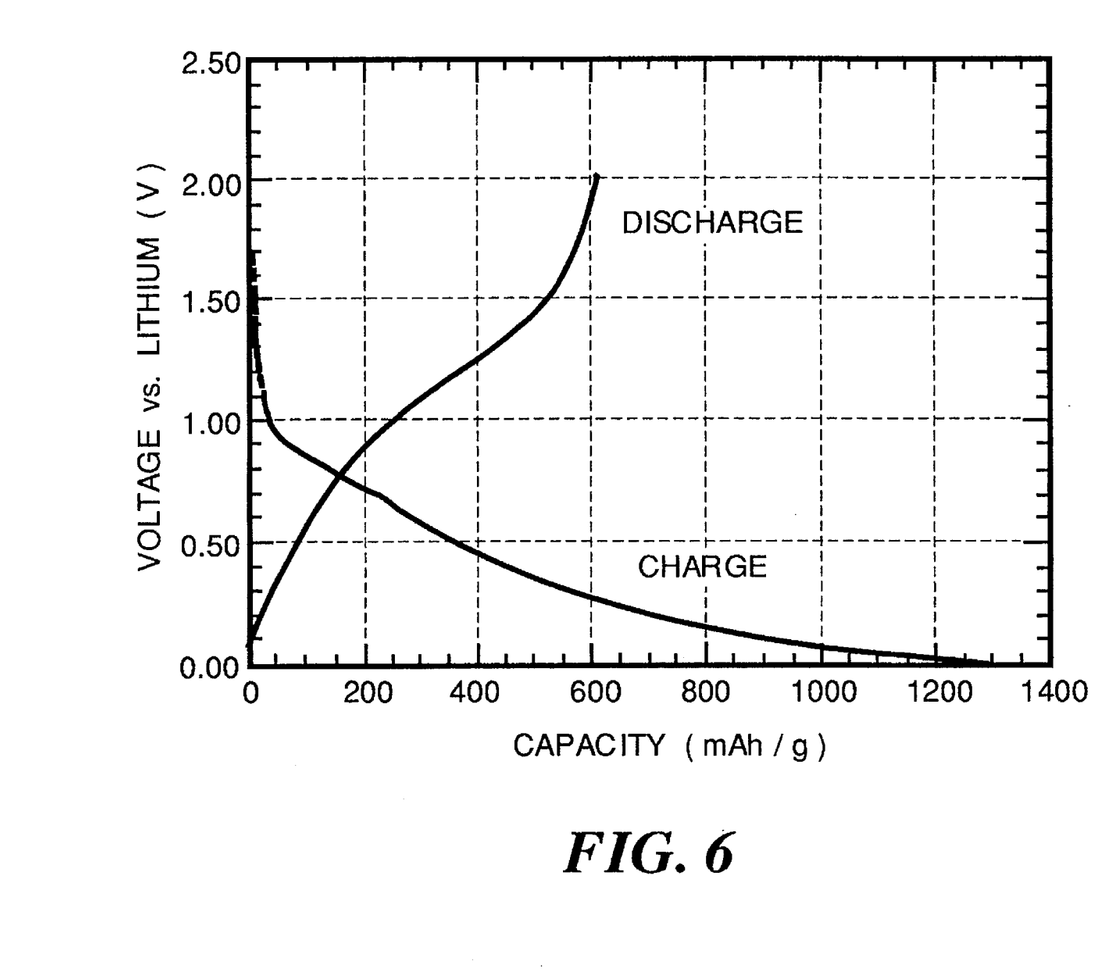
FIG. 6 is a charge and discharge curve for a material prepared at 600° C. in accordance with the instant invention.

Referring now to FIG. 6, there is illustrated therein a charge and discharge curve for an amorphous carbon material prepared according to this Example VI. The amorphous carbon material shows good capacity of lithium intercalation and more specifically as shown in FIG. 6, the charge capacity is 1260 mAh/g and discharge capacity is over 600 mAh/g. This indicates the material which would have excellent characteristics in a lithium type electrochemical cell.

Example VII 5.0 grams (g) of α-resorcyclic acid was subjected to a solid state carbonization process, in an inert environment, according to m following program: (1) heating the monomer from room temperature to 220° C. at a rate of 1° C./minute; (2) holding the material at that temperature for 8 hours; (3) heating the material from 220° C. to 700° C. at a rate of 1° C./minute; and (4) holding the material at that temperature for 24 hours. The resulting material weighted 2.06 g, indicating a yield of 41.2%. X-ray diffraction indicates that the carbon material is amorphous.

Figure 7:
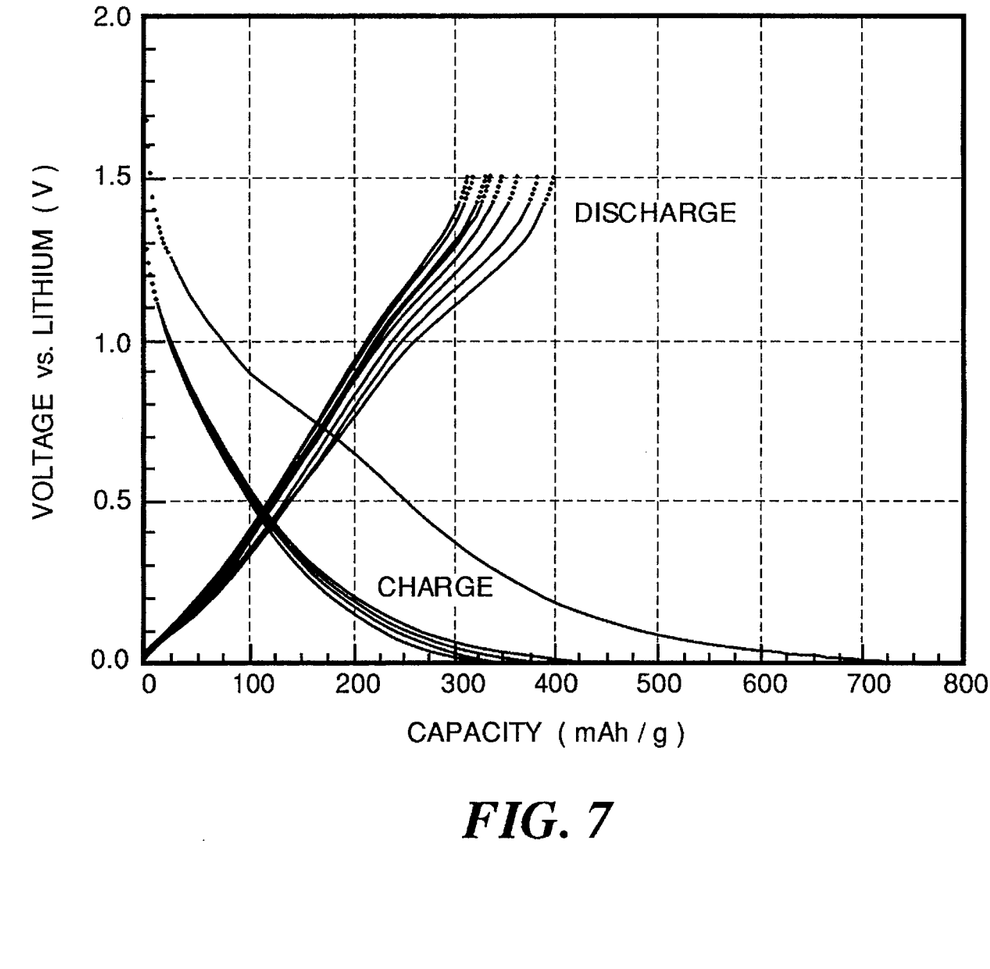
FIG. 7 is a series of charge and discharge curves for a material prepared at 700° C. in accordance with the instant invention.

Referring now to FIG. 7, there is illustrated therein the charge and discharge curves for the first ten cycles of an amorphous carbon material prepared in accordance with this example. As maybe appreciated from FIG. 7, the material shows capacity of approximately 400 mAh/g with a high degree of repeatability between each cycle, and little fade.

Example VIII 5.0 grams (g) of α-resorcyclic acid was subjected to a solid state carbonization process, in an inert environment, according to m following program: (1) heating the monomer from room temperature to 220° C. at a rate of 1° C./minute; (2) holding the material at that temperature for 8 hours; (3) heating the material from 220° C. to 1100° C. at a rate of 1° C./minute; and (4) holding the material at that temperature for 24 hours. The resulting material weighted 1.78 g, indicating a yield of 35.6%. X-ray diffraction indicates that the carbon material is amorphous.

Figure 8:
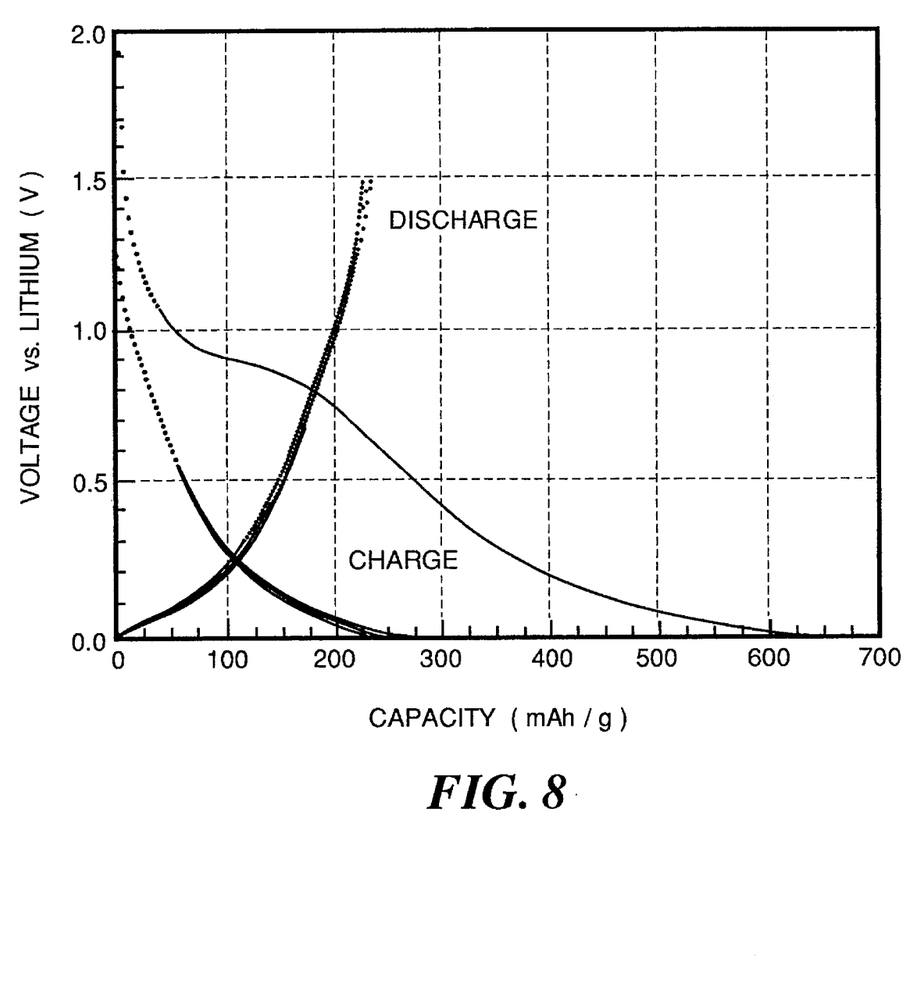
FIG. 8 is a series of charge and discharge curves for a material prepared at 1100° C. in accordance with the instant invention.

Referring now to FIG. 8, there is illustrated the charge and discharge curves for the first ten cycles of an amorphous carbon material prepared in accordance with this Example 8. As may be appreciated from FIG. 8, the charge and discharge characteristics are extremely uniform between cycles, however, capacity is only about 250 mAh/g.

The results of each of the examples can be compared in order to make some determinations regarding the method for preparing amorphous materials according to the instant invention. For instance, Examples I and II both use α-resorcyclic acid as the starting material and both heat from 0° to 220° in an initial heating process. Thereafter, the carbonization processes are different from each other in that the final temperature of heating is 500° in Example I versus 900° in Example II. From these two examples, it may be appreciated that the yield of the end product is higher at lower temperatures than at higher as the yield in Example I (500°) was 52% versus 37% for Example II.

Similarly, comparing the results of Examples III and IV, one may once again appreciate some distinctions. Both Examples III and IV use α-resorcyclic acid and a heating regime of 0°–220° and 220–°500°, both as in Example I. However, in Examples 3 and 4, α-resorcyclic acid is heated in the presence of an acid; $H_3PO_4$ in Example III and p-toluenesulfonic acid in Example IV. In each of Examples III and IV, the yield of the end product is improved over that of Example I. In Example III, the yield of the end product is 56%, while in Example IV (p-toluenesulfonic acid), the end product yield is 60%. Accordingly, one may appreciate that adding the step of providing an acid in the presence of the organic monomer starting material will improve yield of the end product. As noted hereinabove, this is believed to be due to the fact that the acid catalyzes the ester condensation reactions which would be prevalent when using resorcyclic acid as a starting monomer.

With respect to the Example V, the amorphous carbon material is fabricated from a different starting multi-functional monomer, namely, 5-hydroxyisophthalic acid. The material was heated ultimately to 500° providing a 34% yield.

With respect to Examples VI, VII, and VIII, the effect of ultimate temperature on the carbonization process may be readily appreciated. At lower temperatures, as for instance in Example VI, yield of the material is 44.8%, but goes down in Examples VII and VIII. By comparing the results of Examples VI, VII, and VIII, with that of Example II, one can readily see that higher temperatures have a deleteriously effect upon the yield of the end product.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rechargeable electrochemical cell comprising:
a lithium intercalation cathode; an electrolyte; and an anode fabricated of an amorphous carbon material resulting from the condensation and reduction of a multi-functional organic monomer having the structure:

wherein $R_1$, $R_2$, and $R_3$ are all selected from the group consisting of carboxylic acids of eight carbons or less, carboxylic esters of eight carbons or less, alcohols of eight carbons or less, carboxylic anhydrides of eight carbons or less, amines, and combinations thereof, and wherein at least one of $R_1$, $R_2$, and $R_3$ is different than the others.

2. A rechargeable electrochemical cell as in claim 1, wherein said multi-functional organic monomer is α-resorcyclic acid.

3. A rechargeable electrochemical cell as in claim 1, wherein said cathode is a lithiated transition metal oxide.

4. A rechargeable electrochemical cell as in claim 1, wherein said electrochemical cell is a battery.

* * * * *